Patented May 15, 1923.

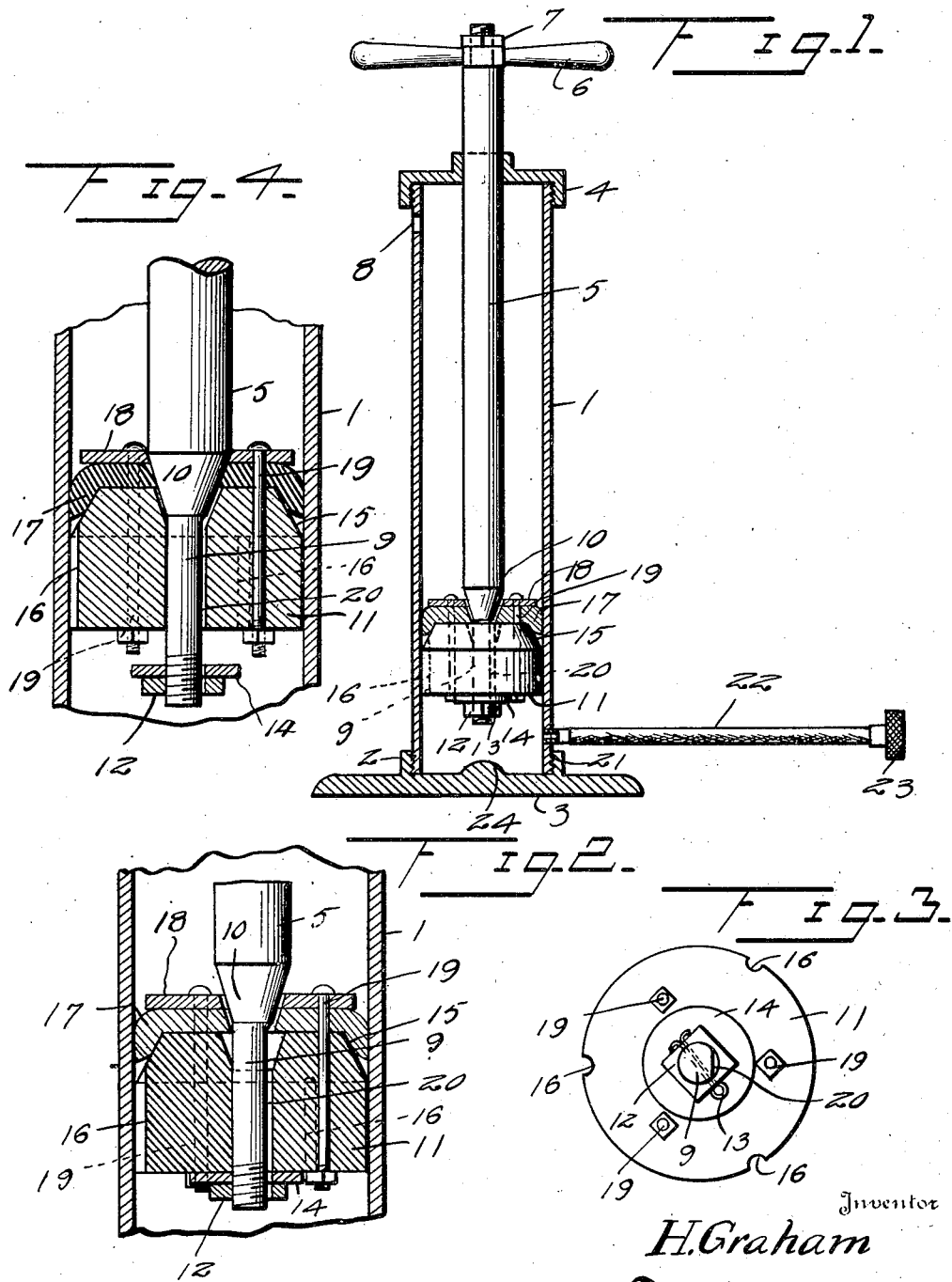

1,455,584

UNITED STATES PATENT OFFICE.

HOWARD GRAHAM, OF KNIPPA, TEXAS.

TIRE PUMP.

Application filed August 3, 1921. Serial No. 489,495.

*To all whom it may concern:*

Be it known that I, HOWARD GRAHAM, a citizen of the United States, residing at Knippa, in the county of Uvalde and State of Texas, have invented certain new and useful Improvements in Tire Pumps; and I do hereby declare the following to be a full, clear, and exact description of the invention, such as will enable others skilled in the art to which it appertains to make and use the same.

This invention relates to new and useful improvements in tire pumps and has for its primary object the provision of a piston adapted to perform its usual function of an air compressing medium and also adapted to act as a valve between the air inlet and the air compressing chamber to permit the latter to receive its full amount of air on the non-working stroke of the piston, consequently obviating the employment of the usual check valve for such a purpose.

Another object of this invention is the provision of a tire pump of the above stated character which will be simple, durable and efficient, and which may be manufactured and sold at a comparatively low cost.

With these and other objects in view, as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 1 is a vertical sectional view illustrating a tire pump constructed in accordance with my invention, Figure 2 is an enlarged vertical sectional view illustrating the piston and its connection with the piston stem or rod, Figure 3 is an end view illustrating one end of the piston head.

Referring in detail to the drawings, the numeral 1 indicates a cylinder which has each end externally screw threaded and one end is threaded in an annular flange 2 formed upon a base 3 of the usual construction. The base 3 projects beyond the cylinder 1 for the purpose of forming a foot rest. A cap 4 closes the other end of the cylinder 1 by being threaded thereto and is provided with a centrally arranged opening to receive a piston stem or rod 5.

The stem or rod 5 has its upper end reduced and provided with a removable handle 6 and the latter is retained on the stem or rod 5 by a nut 7. The cylinder 1 adjacent to the closure cap 4 is provided with the usual vent opening 8.

The stem or rod 5 has its lower portion reduced to form an extension 9 and a conical shaped portion 10 between said extension 9 and the rod or stem 5. A piston head 11 is slidably mounted on the extension 9 and is retained thereon by means of a nut 12 threaded to the end of the extension 9 and held thereon against accidental displacement by a cotter key 13. A washer 14 is positioned between the nut 12 and the lower end of the piston head 11. The nut 12 and its washer 14 is adapted to limit the movement of the head 11 in one direction, while the conical portion 10 of the stem or rod 5 is adapted to limit the movement of the head in an opposite direction and form a seat therefor. The lower portion of the head 11 contacts with the wall of the cylinder 1 while the upper portion is slightly reduced as illustrated at 15 to form an air pocket between the wall of the cylinder and said piston head. Grooves 16 are formed in the head 11 between the lower end thereof and the pocket 15 for the purpose of permitting air to pass the head 11 during its movement in either direction.

A cup-shaped washer 17 is mounted on the upper end of the head 11 and is provided with a centrally arranged opening to receive the piston rod or stem 5. A wear plate 18 is mounted on the stem or rod 5 and rests upon the washer 17. Tie rods 19 pass through the wear plate 18, washer 17 and the piston head 11 and receive nuts upon their ends. The opening of the washer 17 is of substantially conical shape to conform to the conical portion 10 of the piston stem or rod 5 so that when the stem or rod is on its downward movement, the air compressed within the air chamber or the lower portion of the cylinder 1 will force the piston upwardly on the extension 9 which causes the washer to contact with the conical portion of the stem or rod 5 and also with the wall of the cylinder consequently preventing the escape of air during the compression stroke of the piston. On the non-working or suction stroke of the piston, the head 11 is in contact with the washer 14 which moves the washer 17 and wear plate 18 away from the conical portion 10 of the piston stem or rod 5 for the purpose of permitting air to pass the washer 17 and the extension 9 is provided with a flattened face 20 which afford a passageway not only through head 11, washer 17 and plate 18 but also through washer 14 and nut 12 permitting the passage of air between said extension and the piston head 11 so that the air may enter the compressing chamber from the vent opening. The lower end of the cylinder is equipped with a nipple 21 to which a hose 22 may be connected and the latter at its free end is provided with the usual valve engaging member 23 and is adapted to be applied to the valve stem of a tire in the usual manner. The base 3 is provided with a stop 24 adapted to limit the downward movement of the piston stem on rod 5.

On the working or down stroke of the piston head 11, a certain amount of air passes through the grooves 16 into the air pocket 15 forcing the washer 17 in contact with the wall of the cylinder, consequently preventing the air from escaping beyond the piston during said working or air compressing stroke.

While I have shown and described the preferred embodiment of my invention, it will be understood that minor changes in construction, combination, and arrangement of parts may be made without departing from the spirit and scope of the invention as claimed.

Having thus described my invention what I claim is:—

In combination, a piston head, said head having a pocket, a washer disposed in said pocket, a wear plate on said washer, tie means securing said head, washer and plate together, said head having a peripheral groove in communication with said pocket whereby compression may reach said washer, said rod having a conical seat engageable by said head, washer and plate, said rod having an extension of reduced diameter extending from the frustrum of the seat, said extension having a side portion reduced in cross-sectional area, said plate, washer and head being slidable away from said seat, an element screw threaded on said extension to limit the latter movement, the side portion serving to provide an opening through said element.

In testimony whereof I affix my signature in presence of two witnesses.

HOWARD GRAHAM.

Witnesses:
  W. M. BRODIE,
  MENA GIBBENS.